J. S. KENNARD, Jr.
COMBINED MOTION PICTURE CAMERA AND PROJECTOR.
APPLICATION FILED DEC. 15, 1919.
1,352,003.
Patented Sept. 7, 1920.
2 SHEETS—SHEET 1.
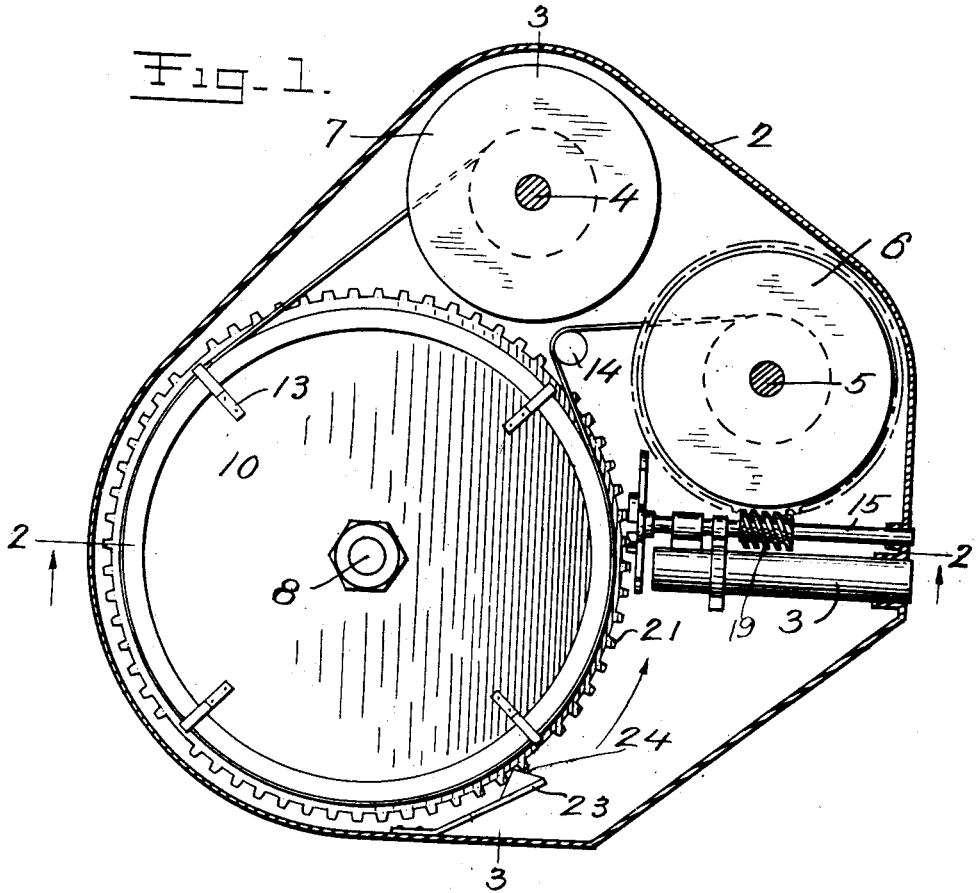
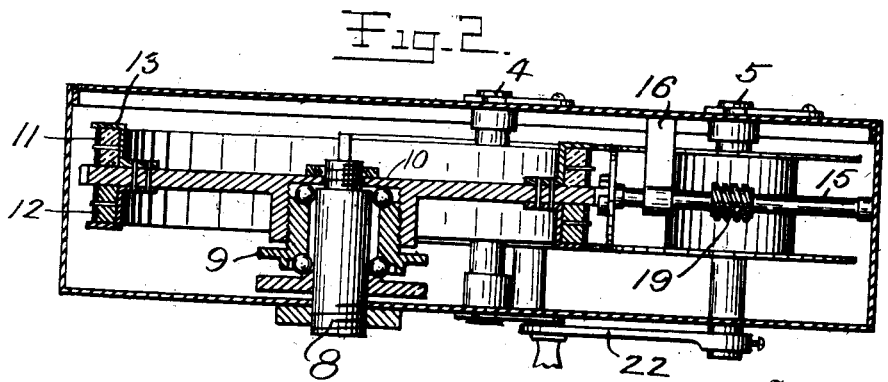
Inventor
J. S. Kennard, Jr.
By his Attorney
Wm Wallace White

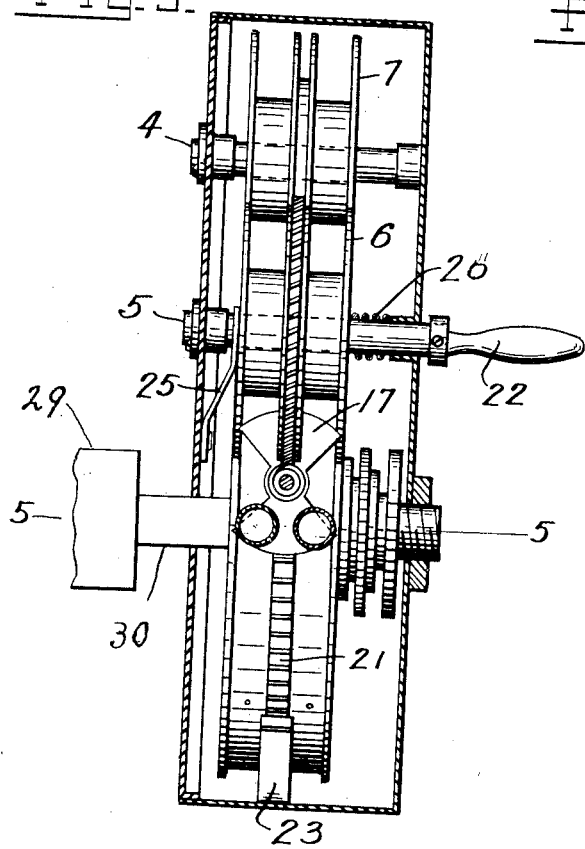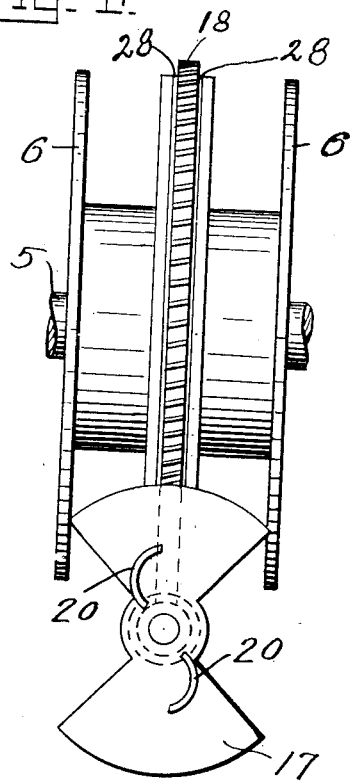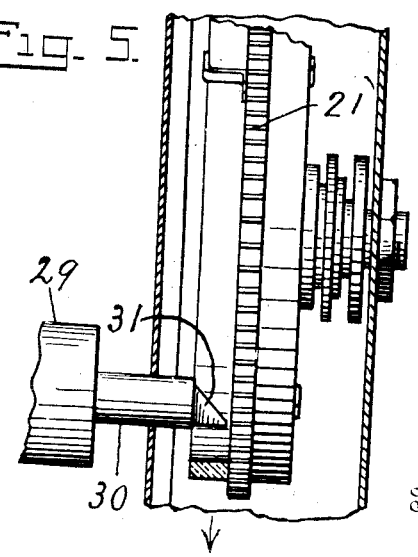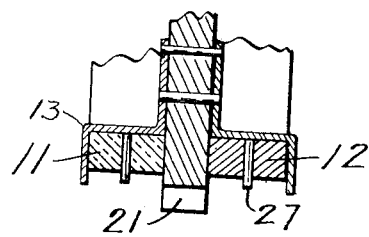

UNITED STATES PATENT OFFICE.

JOSEPH S. KENNARD, JR., OF NEW YORK, N. Y.

COMBINED MOTION-PICTURE CAMERA AND PROJECTOR.

1,352,003.　　　　Specification of Letters Patent.　　Patented Sept. 7, 1920.

Application filed December 15, 1919. Serial No. 345,018.

*To all whom it may concern:*

Be it known that I, JOSEPH S. KENNARD, Jr., a citizen of the United States of America, residing at New York, county and State of New York, have invented new and useful Improvements in Combined Motion-Picture Cameras and Projectors, of which the following is a specification.

This invention relates to improvements in motion picture cameras and projectors, by means of which pictures may be photographed upon a strip of film and the same machine used for projecting the so photographed pictures upon a screen, the principal object of the invention being to provide, in a machine of this character, a transparent means for supporting the film to be projected.

A further object of the invention is to provide, in a machine of the character set forth, improved means for supporting the film strip during the process of photographing or projecting, whereby the tearing strain ordinarily on the film when being wound from one spool to another is eliminated, and which means will support the film strip more firmly in place during the process of photographing or projecting than has heretofore been found possible.

A further object of the invention is to provide a machine of the character set forth, having a wheel for supporting the film and means for rotating said wheel synchronously with the opening of the shutter, the organization being such that pictures of much smaller size than has heretofore been found practical can be taken and projected.

A further object of the invention is to provide, in combination with a camera having a pair of lenses mounted therein, of a film supporting member provided with a transparent portion for supporting a film to be projected, and an opaque portion for supporting a film on which pictures are to be taken, the organization being such that the transparent and opaque portions of the supporting member are in direct alinement with the lenses respectively, and means for operating said member synchronously with the opening of the shutter.

With the foregoing and other objects in view, which will appear as the description proceeds, the invention consists in the novel features of construction and combination of parts which will be more fully described hereinafter and particularly pointed out in the claims.

In the drawing accompanying and forming part of this specification:

Figure 1 is a partly sectional side elevation of a camera with the side wall and one of the lenses removed so as to show the film supporting the shutter operating mechanism mounted therein;

Fig. 2 is a sectional view taken approximately on the line 2—2 of Fig. 1, looking in the direction of the arrows;

Fig. 3 is a front elevation of the mechanism, the walls of the casing being shown in section taken approximately on line 3—3 of Fig. 1, the lenses and motion transmitting shaft being also shown in section.

Fig. 4 is a detail rear elevation on a larger scale, of the shutter-operating gear mounted on the shaft carrying the winding spools and illustrating the cams carried by the shutter for operating the film supporting wheel;

Fig. 5 is a fragmentary sectional view taken approximately on line 5—5 of Fig. 3, and illustrating a portion of the film supporting wheel in association with means for projecting light through the transparent portion of said wheel; and Fig. 6 is a fragmentary view, on an enlarged scale, of the film-supporting wheel.

Similar characters of reference designate corresponding parts in the different figures of the drawings.

Referring to the drawings, 2 designates a casing or housing which may be of any suitable form, and is provided with a pair of lenses 3 mounted in the front wall thereof. Mounted for rotation in the side walls of the casing are a pair of shafts 5 and 4, on which are adapted to be carried for rotation with said shaft a pair of double spools 6 and 7 respectively. Secured in one of the side walls of the casing is a stub shaft 8, on which is carried a ball-bearing 9 for supporting a film-supporting wheel 10 for rotation on said stub shaft. On one side of the wheel 10 is secured an annular member 11 of transparent material, while on the other side of the wheel is secured an annular member 12 of opaque material, the wheel being so mounted or adjusted on the stub shaft that the annular members 11 and 12 are respectively in line with the lenses. The members 11 and 12 may be secured to the wheels in any suitable manner. In the present instance they are shown supported by means of L-shaped brackets 13 secured by a rivet to the wheel 10, four of such brackets being shown in Fig. 1. The wheel 10 and the double spools 6 and 7 are mounted in such relation that the annular members secured to the wheel are also in alinement with the individual spools at the right and left sides of the camera respectively, so that when a full spool is placed on the shaft 4 the film can be passed around the wheel 10 in engagement with one or the other of the annular members 11, 12 and its end secured on the corresponding spool on the shaft 5, an intermediate roller 14 being also shown in Fig. 1 for properly guiding the film in its passage from the annular member of the wheel 10 to the front spool 6.

For rotating the wheel 10 synchronously with the opening of the shutter, I have provided a shaft 15 mounted for rotation at one end thereof in the front wall of the casing, the opposite end being supported by means of a bracket 16 secured to the inner face of one of the side walls of the casing. At its rear free end the shaft 15 has secured thereto a shutter 17, in the present instance having the form of a pair of oppositely disposed quadrants adapted to permit passage of light through the lenses at the proper time. For operating the shaft 15, and thereby the shutter 17, I have provided a gear 18 adapted to be secured to the spool-carrying shaft 5 between the pair of spools 6, this gear being provided with angularly disposed teeth in the nature of a worm gear, while on the shaft 15 is secured a small pinion 19, having angularly disposed teeth adapted to mesh with the teeth of the gear 18 so that rotation of the gear 18 will cause the rotation of the shaft 15, thereby alternately to open and close the lenses. For transmitting the rotary motion of the shaft 15 intermittently to the wheel 10, a pair of cam-formed members 20 are secured to or formed integral with the rear face of the shutter 17, these cam members being shown most clearly in Fig. 4. The wheel 10 is provided around its periphery with a plurality of teeth adapted to be engaged by the cam members 20 and thereby cause the rotation of the wheel 10 when the shaft 15 is rotated, the shaft 15 being mounted at such an angle to the wheel 10 that when one of the cam members is in engagement with the teeth of the wheel, the other cam member is sufficiently far from the wheel 10 to permit the free passage of the teeth 21 on the wheel. From the structure so far described it will readily be seen that when the shaft 5 is rotated motion will be transmitted therefrom through the gear 18 and pinion 19 to the shaft 15 and thereby the shutter will be rotated so as to alternately open and close the lenses, while at the same time the cam members 20 on the rear face of the shutter will intermittently rotate the wheel 10 with a step-by-step motion, so that as each picture space on the film arrives opposite the lens, the rotation of the wheel 10 will be stopped while the lens is open, and will continue when the lens is closed. For rotating the shaft 5 a crank handle 22 is provided. To insure the stopping of the wheel 10 positively at the proper time a spring 23 is secured at the bottom of the casing, and is provided with a pawl or dog 24 adapted to ride over the teeth of the wheel 10 and so shaped as to prevent rotation of the wheel beyond the point where the picture space on the film is opposite the lens during the time that the lens is open. It will be understood, of course, that the spools are mounted on the shafts 4 and 5 with sufficient freedom that the shafts may rotate without carrying the spools with them, a pair of the ordinary friction disks being carried on the shaft 5, one at each side of the gear 18, and brought into operation by a spring 25 secured to the casing at one side of one of the spools 6 and adapted to exert its tension on said spool and a coil spring 26 encircling the shaft 5 at the other side of the pair of spools 6, so that when there is no appreciable friction on the film, as for instance when the cam 20 is in engagement with the teeth of the wheel 10, the spools 6 will be rotated with the shaft 5, but when the cam passes out of engagement with the wheel 10 and thereby causing the rotation of the wheel to cease, the increased tension of the film will cause the spools 6 to cease rotating until the shaft 5 has been rotated sufficiently to cause the other cam member to engage with the wheel 10.

From the structure so far described it will be seen that, since the film is supported almost around the entire circumference of the wheel 10, it will not be necessary to provide the usual large number of radial pins for engagement with openings in the film at each longitudinal edge thereof, whereby the life of the film is materially lengthened. In the present instance it will be necessary to provide only an occasional pin, and as herein shown I have provided these pins in the annular members 11 and 12 along the circumferential center line of such members, the pins 27 being preferably inserted through an opening in the annular members 11 and 12, and having their inner ends screwed or otherwise secured in the horizontal portion of the bracket 13 by which the annular members are secured to the wheel 10. It will be seen from an inspection of Fig. 1 that the teeth around the circumference of the wheel 10 are divided into a plurality of sections or series, a sufficiently wide space being left between the teeth of adjacent series to insure that the brackets 13 will never stop opposite the lens when the rotation of the wheel 10 ceases, the formation of the dog 24 carried by the spring 23 being such as to positively prevent the cessation of the rotation of the wheel until the bracket has passed the lens.

In Figs. 3 and 5 is illustrated an embodiment of an apparatus for projecting light through the transparent film supporting member and lens. The reference character 29 designates a fragment of a lighting apparatus having a tubular member 30 passing through an opening in the side wall of the casing and having secured at its inner end a right angled prism 31 so located as to deflect the light through the transparent film supporting member and lens, for instance in the direction of the arrow in Fig. 5.

When the machine is to be used for taking pictures, a spool of film is placed on the shaft 4 and the film passed down around the circumference of the opaque annular member 12 on the wheel 10 and up around the roller 14, the end of the film being secured to the hub of that spool 6 which is in the same vertical plane as the opaque member 12. When the shaft 5 is rotated by means of the crank handle 22, the spools 6 will be rotated therewith to wind the film thereon and at the same time cause the shutter to rotate between the lens and the film so as to alternately open and close the lens, the cams 20 successively engaging the teeth on the wheel 10 to rotate the wheel to present the picture spaces of the film in proper position to be exposed when the lens is open. The flexible connection between the shaft 5 and the spool 6 is of sufficient strength, as hereinbefore stated, to cause rotation of the spool with the shaft when either of the cams 20 is in engagement with the film supporting wheel 10, but such connection will be broken as soon as the cam passes out of engagement with said wheel, thereby permitting the film to remain stationary while being exposed.

When the machine is to be used for projecting pictures the film spool is placed on the shaft 4 at the side of the wheel 10 in line with the transparent film-supporting member and is carried forward around said member in the same manner as already described in connection with the opaque member. The operation by means of the crank handle is also identical with that already described. Light is directed from the lighting apparatus 29 through the tube 30 and is deflected by means of the prism 31 at an angle to the line of incidence, and out through the transparent film-supporting member and lens. It will be understood, of course, that the angle referred to need not be a right angle, but the light may be projected into the machine at any convenient angle and a prism of the proper shape, or a mirror properly placed, to direct the light through the transparent member and lens.

While I have described in detail the apparatus herein illustrated, it is to be understood that I do not thereby limit my invention to the precise features of construction shown, as I am aware that many mechanical changes and modifications may be made therein without departing from the spirit and scope of the invention as set forth in the appended claims.

Having thus described my invention, what I claim is:

1. In a picture-taking and projecting machine, the combination of a casing provided with a lens, means for supporting a pair of film spools, means for rotating one of said spools, a member mounted for rotation in said casing, a transparent annulus secured to said member in line with the lens and adapted to support a film during its passage from one spool to the other, and means for causing intermittent rotation of said member during the rotation of the spool.

2. The combination with a picture-taking and projecting machine constructed as set forth in claim 1, of means for directing light through the transparent annulus.

In testimony whereof I have signed my name to this specification.

JOSEPH S. KENNARD, Jr.